Jan. 6, 1970     T. A. FIRESTONE     3,488,229
METHOD OF CUTTING METAL SHEETS
Original Filed May 4, 1964
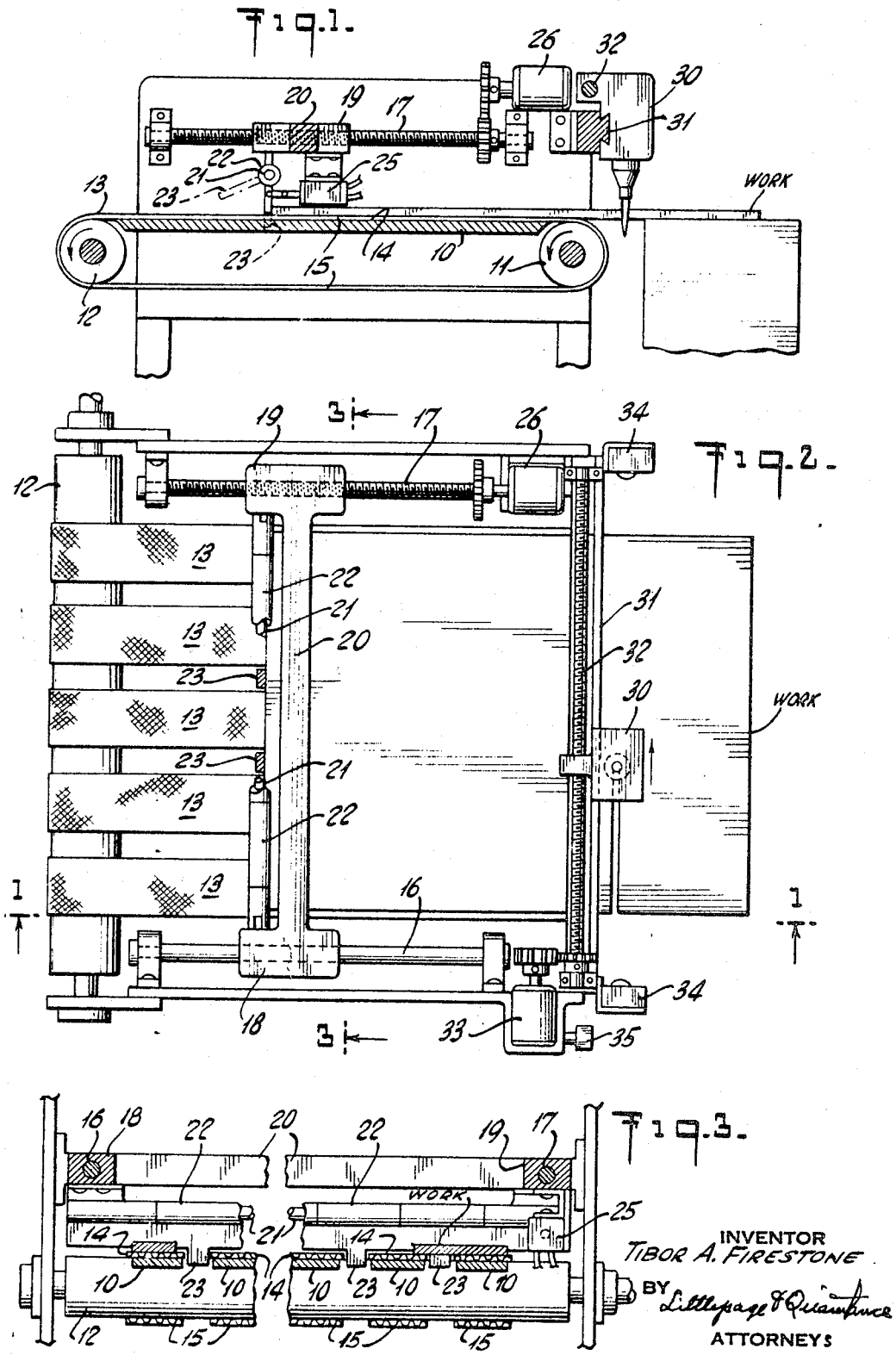
INVENTOR
TIBOR A. FIRESTONE
BY
ATTORNEYS

United States Patent Office 3,488,229
Patented Jan. 6, 1970

3,488,229
METHOD OF CUTTING METAL SHEETS
Tibor A. Firestone, 1270 5th Ave.,
New York, N.Y. 10029
Original application May 4, 1964, Ser. No. 364,631, now Patent No. 3,357,690, dated Dec. 12, 1967. Divided and this application Sept. 8, 1967, Ser. No. 666,368
Int. Cl. B23k 7/00
U.S. Cl. 148—9    6 Claims

ABSTRACT OF THE DISCLOSURE

End pieces are cut off lengths of flat material of varying lengths and thicknesses by moving a length longitudinally forward by its forward portion resting on a conveyor until its end edge abuts stop means on a transverse line to position said end accurately. Next a high intensity cutting beam or flame is moved along a transverse cutting line rearwardly of said conveyor and parallel to the line of said stop means to sever the end piece without exerting mechanical force on the material, so that the end piece is maintained in position by the stop means without further guides. The stop means then release the severed piece for movement by the conveyor to a discharge point, and the end portion of the length of material is moved forwardly until its end edge is positioned by the stop means and the cycle is repeated.

---

This application is a division of application Ser. No. 364,631, now Patent No. 3,357,690, filed May 4, 1964 for Square Shearing Device.

This invention comprises a method for cutting a strip, sheet or plate of metal to a pre-determined length, with accuracy and with a minimum of labor, an operation usually carried out in the industry with squaring shears.

It is an object of this invention to move a sheet or plate of metal accurately to the cutting position by a conveyor in such a manner that the individual sections are exactly positioned, and are cut to an accurate size without the need of individual measurement or handling.

A sheet or plate of metal is easily brought to rest against a pre-set stop and then quickly and accurately cut along a pre-determined line, and thereafter the cut off piece is carried through the device and delivered to be piled in a pile, or carried away, as desired, while another sheet or plate is being moved up to cutting position.

The conventional squaring shears are built in various sizes for various capacities. To shear through a light metal relatively small force is needed compared to cutting ¼″, ½″ or 1″ plate. As the thickness of the metal to be cut increases, not only the frame work and the cutting force of shear has to be increased in tremendous proportions, but also the foundation work for the shear has to be built deeper and stronger to withstand up to 50 tons and more of impact force. Using a shear in accordance with this invention the necessity of all this will be eliminated, as we do not have to consider impact reaction any more. The shear table will have to be built just strong enough to carry only the dead weight of the material to be cut.

The conventional shears are equipped with a set of knives. One knife is stationary, the other moves up and down in shearing action. The back-gauge angle and outrigger arms in most cases are directly or indirectly connected with the moving knife and move with it up and down. This up and down movement of the knife and back-gauge angle prevent placing a solid type support under the material to be cut (the overhanging part of material between the knife and back-gauge angle) thus the support for the material against flexing has to go up and down with the knife and gauge angle, or else no support is provided against flexing.

With the high intensity cutter, the necessity of an up and down moving support table is eliminated and a fixed, even height with shear table and conveyor may be incorporated into the shear design, simplifying not only the continuous conveying of cut material (no more accumulation) but the stacking as well.

The device is shown in the accompanying drawings, in which FIG. 1 is a vertical longitudinal section through the machine, transverse to the cutting line; FIG. 2 is a top plan view, and FIG. 3 is a section along the line 3—3 of FIG. 2.

In the drawing the device comprises a table 10 having a roller 11 journalled in its front edge, and a similar roller 12 at its back edge, and over these rollers there is carried a series of spaced parallel belts or chains 13, the upper stretch 14 of which rests upon the face of the table 10, while the lower stretch 15 of the belts 13 returns below the table top.

Mounted on the opposite sides of the table 10 and above the upper stretch 14 of the belts in a pair of contol rods 16 and 17. The outer surface of rod 16 is smooth and a sleeve 18 slides upon it, while the rod 17 is screw threaded into a threaded sleeve 19. These two sleeves are connected rigidly by a cross bar 20 so that by rotating rod 17, the cross bar 20 may be moved over the sheet or plate, always parallel to the front edge of the table.

Attached to the sleeves 18 and 19 is journalled a cross shaft 21 parallel to the cross bar 20 and on this shaft 21 there is journalled a sleeve 22 carrying a plurality of stop fingers 23 adapted to extend down between the belts 13, so that when the sleeve 22 is turned to hold the fingers 23 downwardly, they serve as stops to limit the movement of the sheet or plate as it is carried into the machine, to hold it while the cutting takes place.

This sleeve 22, however, may be turned by a magnetic control switch 25 which, at a proper time will rotate sleeve 22 to raise the stops 23 above the sheet or plate, and at the same time start the belts in motion whereby the cut sheet or plate passes beneath the stops and out the machine. The length of the cut sheet is determined by a motor 26 which may be rotated to move the cross bar 20 to the desired position.

The cutting torch, which may be of any form of high intensity cutter, such as a high energy stream of particles or radiation, as a laser beam cutter, a gas flame cutter, or a high intensity plasma jet cutter, is mounted on a track 31, parallel to and above the cutting line of the sheet or plate, and it is moved by a screw 32 parallel to the track. This screw 32 is turned by a hand controlled reversible motor 33 and at the end of each stroke the motor connection is automatically reversed by a reversing device 34 so that the cutter moves forward and back on successive operations.

In using the device the end of the length of sheet or plate to be cut is placed upon the belts 13 and the motor started, and then the end of the sheet or plate will be moved by the belts until it encounters the stops 23. These stops actuate the magnetic control device 25, stopping the belts and the sheet or plate, and conditioning the cutter for further operation.

The operator then closses the cutter control switch 35, starting the screw 32 and moving the high energy stream cutter across the sheet or plate from whichever side it is on and cutting off an end piece. When the sheet is severed, and the high energy stream cutter reaches the end of its travel, it reverses its own circuit for the next cutting. When the cutting is completed, the operator actuates the magnetic control device, which raises the stops 23 and starts the belts 13 in operation, carrying the cut off end of the length of sheet or plate out of the machine and feeds a new end of the length of sheet or plate into it. But when the cut off end of sheet or plate passes out of the machine, the stops 23 are dropped into position so that when the new end of the sheet encounters the stops, the belts are stopped until the next cutting is complete. While the cut end of the sheet is being fed out of the machine, the end of the metal supply sheet or plate may be brought onto the moving belts so that it may be fed up in turn to engage the stops 23.

What I claim:

1. The method of cutting pieces successively from lengths of sheet material of varying widths and thicknesses, comprising:
    (1) moving a length of material longitudinally past a transverse cutting line by frictional engagement of the surface of the end portion of said length with a conveying means beyond said cutting line,
    (2) arresting and positioning the end edge of said length of material by engagement with stop means along a transverse line parallel to said cutting line and intermediate the ends of said conveying means,
    (3) moving a high energy stream cutter transversely along said cutting line without mechanical contact to sever the end portion of said length,
    (4) moving the severed end portion by releasing said stop means and operating said conveying means to convey the end portion beyond the line of said stop means to a discharge point,
    (5) moving the new end portion of said length by said conveying means into engagement with said stop means to repeat the cycle.

2. The method of claim 1, in which the high energy stream cutter is a gas flame cutter.

3. The method of claim 1, in which the high energy stream cutter is a plasma jet cutter.

4. The method of cutting pieces successively from lengths of flat metal material of varying widths and thicknesses, comprising:
    (1) supporting the end of a length of said metal material on a movable conveying means and moving said length by operation of said conveying means,
    (2) arresting and positioning the end edge of said length intermediate the ends of said conveying means by engaging a stop means along a transverse line,
    (3) stopping operation of said conveying means and maintaining said length in position by the weight of said metal supported on said conveying means,
    (4) moving a high energy stream cutter transversely parallel to said line of said stop means and in front of said conveying means to sever the end portion of said length without mechanical force on the length of metal material,
    (5) moving the severed end portion past said stop means by releasing said stop means and operating said conveying means and discharging said portion from said conveying means, and
    (6) moving the end edge of said length to engage said stop means and repeat the cycle.

5. The method of cutting material by moving a cutter along a transverse line as defined in claim 4, which comprises moving the cutter in the opposite direction across the material on the next succeeding cycle.

6. The method of cutting material by moving a cutter along a transverse line as defined in claim 4, which comprises controlling the conveying means by said cutter to start operation of the conveying means at the end of travel of the cutter.

References Cited

UNITED STATES PATENTS

| 3,339,903 | 9/1967 | Reinfeld et al. | 148—9 |
| 3,382,112 | 5/1968 | Oxley et al. | 148—9 |

L. DEWAYNE RUTLEDGE, Primary Examiner

W. W. STALLARD, Assistant Examiner